United States Patent
Sun et al.

(10) Patent No.: US 11,932,325 B2
(45) Date of Patent: Mar. 19, 2024

(54) STEERING CONTROL DEVICE AND METHOD FOR VEHICLE

(71) Applicant: HL MANDO CORPORATION, Pyeongtaek-si (KR)

(72) Inventors: TaeHyung Sun, Gwangmyeong-si (KR); Tae Sik Kim, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 80 days.

(21) Appl. No.: 17/672,886

(22) Filed: Feb. 16, 2022

(65) Prior Publication Data

US 2022/0258793 A1 Aug. 18, 2022

(30) Foreign Application Priority Data

Feb. 18, 2021 (KR) .................. 10-2021-0021855

(51) Int. Cl.
*B62D 5/04* (2006.01)
(52) U.S. Cl.
CPC ......... *B62D 5/0469* (2013.01); *B62D 5/0463* (2013.01); *B62D 5/0466* (2013.01); *B62D 5/0487* (2013.01)

(58) Field of Classification Search
CPC .. B62D 5/0469; B62D 5/0463; B62D 5/0466; B62D 5/0487
See application file for complete search history.

(56) References Cited

U.S. PATENT DOCUMENTS

| | | | |
|---|---|---|---|
| 2018/0370562 A1* | 12/2018 | Haller | B62D 5/0463 |
| 2019/0265064 A1* | 8/2019 | Koenig | G01C 21/3682 |
| 2020/0307686 A1* | 10/2020 | Namikawa | B62D 5/0481 |
| 2020/0331520 A1* | 10/2020 | Varunjikar | B60W 40/103 |
| 2022/0048558 A1* | 2/2022 | Christian, Jr. | B62D 15/0245 |
| 2022/0396308 A1* | 12/2022 | Lee | B62D 5/0463 |

* cited by examiner

*Primary Examiner* — Hunter B Lonsberry
*Assistant Examiner* — Jay Khandpur
(74) *Attorney, Agent, or Firm* — Hauptman Ham, LLP (57) ABSTRACT

The embodiments of the present disclosure relate to a steering control device and method of a vehicle, specifically, may provide a steering control device and method of a vehicle capable of securing the driving stability by controlling the alignment of the vehicle wheels by rapidly detecting a misalignment between the steering angle of the steering wheel and the steering angle of the vehicle wheel.

11 Claims, 9 Drawing Sheets

STEERING CONTROL DEVICE AND METHOD FOR VEHICLE

CROSS REFERENCE TO RELATED APPLICATION

This application claims priority from Korean Patent Application No. 10-2021-0021855, filed on Feb. 18, 2021, which is hereby incorporated by reference for all purposes as if fully set forth herein.

TECHNICAL FIELD

An embodiment of the present disclosure relates to a steering control device and method of a vehicle.

BACKGROUND

A steering system of a vehicle refers to a system capable of changing a steering angle of a wheel based on a steering force (or rotational force) applied to a steering wheel by a driver of a vehicle. Recently, an electric power steering system (EPS) has been applied to a vehicle in order to reduce the steering force of the steering wheel to ensure the stability of the steering state. In addition, recently, there is actively conducted a research on a steer-by-wire(SbW)-based vehicle steering apparatus. In such a steer-by-wire-based vehicle steering apparatus, a steering column module connected to a steering wheel and a steering rack module connected to the wheel are mechanically separated from each other.

Therefore, in a steer-by-wire-based vehicle steering apparatus, since a steering column module and a steering rack module are mechanically separated from each other, there may occur a misalignment between the steering angle of the steering wheel and the steering angle of the vehicle wheel, thereby deteriorating the safety for a driver.

SUMMARY

Embodiments of the present disclosure provide a vehicular steering control device and method capable of securing the driving stability by controlling the alignment of the vehicle wheels by rapidly detecting a misalignment between the steering angle of the steering wheel and the steering angle of the vehicle wheel.

In an aspect of the present disclosure, the present embodiments may provide a steering control device of a vehicle including an overheat detector configured to detect whether of an overheating state of a reaction force motor based on motor temperature information of the reaction force motor, an alignment determiner configured to determine whether of an alignment of a steering wheel and a rack displacement based on steering angle information of the steering wheel and position information of the rack displacement, and a controller configured to, if the overheating state is detected and determined that the alignment of the steering wheel and the rack displacement is misaligned, set a point where the alignment starts to be misaligned as an initial point, store steering angle information of the steering wheel at the initial point as initial point information, and control the steering wheel and the rack displacement to be aligned by using the initial point information.

In another aspect of the present disclosure, the present embodiments may provide a steering control method of a vehicle including detecting whether of an overheating state of a reaction force motor based on motor temperature information of the reaction force motor, determining whether of an alignment of a steering wheel and a rack displacement based on steering angle information of the steering wheel and position information of the rack displacement, and setting, if the overheating state is detected and determined that the alignment of the steering wheel and the rack displacement is misaligned, a point where the alignment starts to be misaligned as an initial point, storing steering angle information of the steering wheel at the initial point as initial point information, and controlling the steering wheel and the rack displacement to be aligned by using the initial point information.

According to embodiments of the present disclosure, it is possible to provide a vehicular steering control device and method capable of securing the driving stability by controlling the alignment of the vehicle wheels by rapidly detecting a misalignment between the steering angle of the steering wheel and the steering angle of the vehicle wheel.

DETAILED DESCRIPTION the present disclosure relates to a steering control device and method of a vehicle.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described terms used in a steering control device and method of a vehicle according to an embodiment of the present disclosure.

An overheat or overheating in this specification is a premise of the operation of the overheat protection (OHP) means, and an overheating state may refer to a state in which heat of a certain temperature or higher is generated in a reaction force motor by repeatedly driving the reaction force motor or generating high output due to an increase in rotation of the steering wheel.

In addition, the overheat prevention means is a protection logic used to prevent damage to the system due to continuous heat generation, and may refer a means to prevent overheating and damage of a hardware by reducing a torque command and using only a minimum current in the case of the overheating state of a motor or an electronic control unit (ECU).

In the present specification, the reaction force motor may mean a steering feedback actuator (SFA) of a steer-by-wire steering apparatus, and the driving motor of the wheel may mean a road wheel actuator (RWA) of a steer-by-wire steering apparatus.

Figure 1:
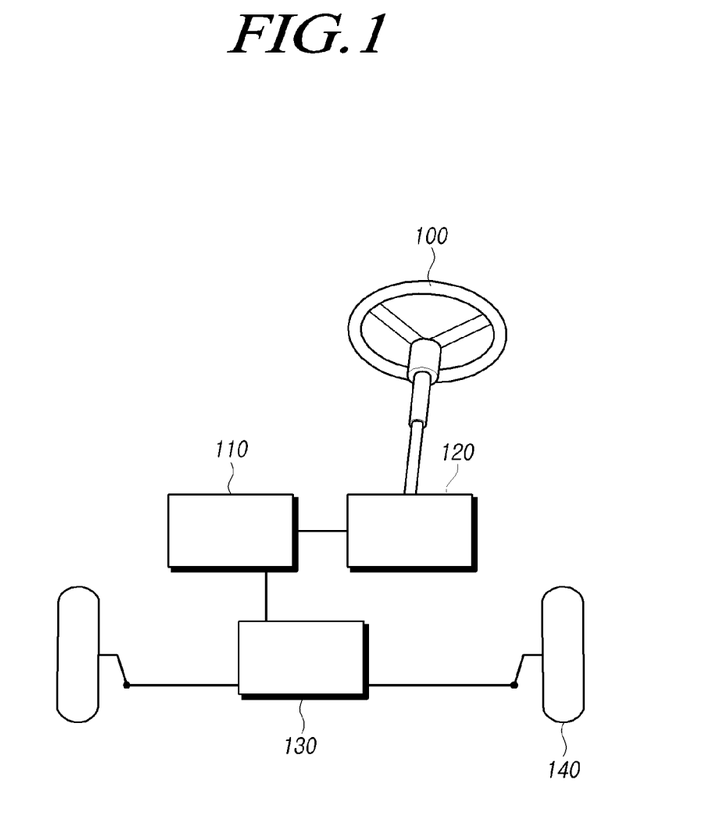
FIG. 1 is a diagram for explaining the overall configuration of a steer-by-wire-based vehicle steering apparatus according to an embodiment of the present disclosure.

FIG. 1 is a diagram for explaining the overall configuration of a steer-by-wire-based vehicle steering apparatus according to an embodiment of the present disclosure.

Referring to FIG. 1, a steer-by-wire vehicle steering apparatus according to an embodiment of the present disclosure may include a steering wheel 100, a steering column module (SCM) 120, a steering rack module (SRM) 130, a control module 110 and wheel 140.

The steering wheel 100 may be operated by a driver's manipulation. For example, the steering wheel 100 is rotated by the driver's manipulation, and the driving direction of the vehicle may be determined or changed based on this.

The steering column module 120 may be connected to the steering wheel 100. Also, the steering column module 120 may include a steering shaft, a steering reaction force motor, and one or more sensors. For example, the steering shaft may be connected to the steering wheel 100. Also, when the steering wheel 100 rotates, the steering shaft may rotate in response to the rotating steering wheel 100. The steering reaction force motor may be coupled to the steering shaft. In addition, the steering reaction force motor rotates in a direction opposite to the rotation direction of the steering wheel 100 to provide a steering reaction force to the steering wheel 100 so that the driver can feel an appropriate steering feeling. The plurality of sensors may include at least one of a steering angle sensor, a torque sensor, and a steering angular velocity sensor. However, the type of sensor is not limited thereto as long as it can measure the states of various components included in the steering column module 120. For example, the steering angle sensor may measure a steering angle that is a rotation angle of the steering wheel 100. The torque sensor may measure torque generated in the steering shaft as the steering wheel 100 rotates. The steering angular velocity sensor may measure the steering angular velocity, which is the rotation angular speed of the steering wheel 100.

The steering rack module 130 may be mechanically separated from the steering column module 120. In addition, the steering rack module 130 may include a driving motor, a pinion, a rack, and sensors. For example, the driving motor may be driven by a driving current. The driving motor may generate a driving torque corresponding to the driving current, and may provide a steering force to the steering wheel 100 based on the generated driving torque. The pinion may be connected to the drive motor. The pinion may rotate based on the driving torque generated by the driving motor. The rack may be connected with a pinion. The rack may perform a linear motion based on the rotational motion of the pinion. That is, the pinion and the rack may change the direction of the steering wheel 100 by providing a steering force to the steering wheel 100 based on the driving torque of the driving motor. The sensors may include at least one of a rack position sensor, a rack displacement sensor, a pinion angle sensor, and a pinion angular velocity sensor. However, if the type of sensor can measure the state of various components included in the steering rack module 130, it is not limited thereto. For example, the rack position sensor may measure the position of the rack, and the rack displacement sensor may measure the displacement of the rack. The pinion angle sensor may measure the angle of the pinion, which is the rotation angle of the pinion. In addition, the pinion angular velocity sensor may measure the angular velocity of the pinion, which is the rotation angular velocity of the pinion.

The control module 110 may control the operation of the steering column module 120 and the steering rack module 130. For example, the control module 110 may generate a control signal by receiving information from each of the components included in the steering column module 120 and the steering rack module 130. In addition, the control module 110 may control the operation of each component included in the steering column module 120 and the steering rack module 130 based on the generated control signal.

Specifically, the control module 110 may control the operation of each sensor disposed in the vehicle. The control module 110 may control the operation of each sensor disposed in the vehicle to generate respective control signals based on respective sensor information therefrom. And, the control module 110 may control the operation of each component included in the steering column module 120 and the steering rack module 130 by using each generated control signal. The control module 110 may refer to a steering control device. In addition, details of the control module 110 will be described later with reference to FIGS. 2 to 8.

The wheel 140 may be connected to the steering rack module 130. For example, while transmitting the rotational force of the drive motor to the rack bar, it can be converted into an axial linear movement force of the rack. In addition, the linear movement force of the rack may be transmitted to the wheel 140 connected through a tie rod and a knuckle arm.

Figure 2:
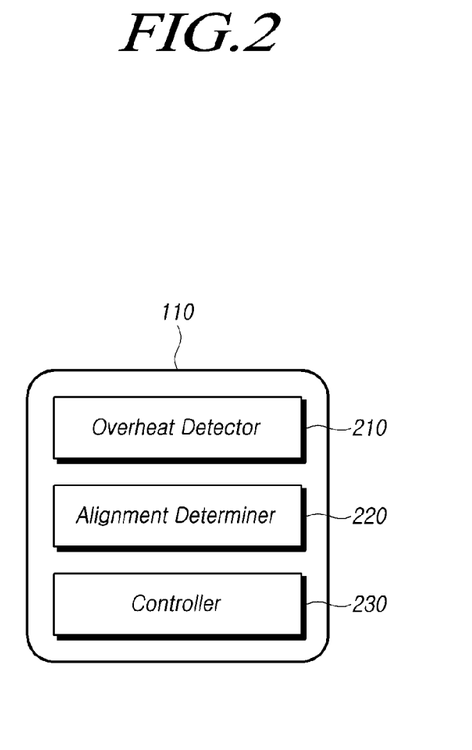
FIG. 2 illustrates a configuration of a vehicle steering control device according to an embodiment of the present disclosure.

FIG. 2 illustrates a configuration of a vehicle steering control device according to an embodiment of the present disclosure.

Referring to FIG. 2, a steering control device 110 according to an embodiment of the present disclosure may include an overheat detector 210 for detecting whether of an overheating state of a reaction force motor based on motor temperature information of the reaction force motor, an alignment determiner 220 for determining whether of an alignment of a steering wheel and a rack displacement based on steering angle information of the steering wheel and position information of the rack displacement, and a controller 230 for, if the overheating state is detected and determined that the alignment of the steering wheel and the rack displacement is misaligned, setting a point where the alignment starts to be misaligned as an initial point, storing steering angle information of the steering wheel at the initial point as initial point information, and controlling the steering wheel and the rack displacement to be aligned by using the initial point information.

The overheat detector 210 may detect the overheating state if a temperature of the reaction force motor detected by a temperature sensor is higher than a preset threshold temperature. For example, the overheat detector 210 may detect the temperature of the reaction force motor driven by the application of current through the temperature sensor, and if the detected temperature is higher than the threshold temperature corresponding to the standard of the reaction force motor, may detect as the overheating state. For example, assuming that the preset threshold temperature is 80 degrees, the overheat detector 210 may detect the overheating state if the temperature of the reaction force motor detected by the temperature sensor corresponds to 90 degrees.

In the case that a position of the rack displacement enters within a preset range at an end of a rack, if at least one of a decrease of a current amount of the reaction force motor and a decrease of a feedback torque of the reaction force motor is detected, the alignment determiner 220 may determine that the steering wheel and the rack displacement are misaligned. For example, the alignment determiner 220 may determine the position of the rack displacement by obtaining the operation state information of the wheel 140 from the steering rack module 130. In this case, the operation state information of the wheel 140 may include at least one of the position information of the rack, the driving current information of a driving motor driving the rack and the pinion, the pinion angle sensor signal information, and the rack position sensor signal information. However, the operation state information of the wheel 140 is not limited thereto, and may include other information for identifying the position of the rack displacement.

For example, the alignment determiner 220 may determine whether the position of the rack displacement falls within a preset range using the acquired position information of the rack displacement. The preset range may be set by a case in which the position of the rack displacement reaches the right end or the left end of rack. In this case, the end may be a position where the rack can no longer move even if the steering wheel is rotated to the right or left. That is, the end may mean a position of the rack in a state in which the wheel can no longer be steered.

The alignment determiner 220 may directly determine whether the steering wheel and the rack displacement are aligned based on the steering angle information of the steering wheel and the position information of the rack displacement. The alignment determiner 220 may compare the steering angle information obtained from the steering angle sensor of the steering column module 120, the steering angular velocity sensor, or the torque sensor of the reaction force motor with the position information of the rack displacement to determine the misalignment. Alternatively, the alignment determiner 220 may compare the steering angle information of the steering wheel with the steering angle information of the wheel 140 to determine the misalignment.

Alternatively, the alignment determiner 220 may quickly determine the misalignment if the position of the rack displacement reaches a preset range from the end of the rack, and if at least one of a decrease of a current amount of the reaction force motor and a decrease of a feedback torque of the reaction force motor is detected. This is because the decrease of a current amount of the reaction force motor detected based on the current information of the reaction force motor may reduce the torque generated by the reaction force motor, which may be a cause of the misalignment of the steering angle of the steering wheel 100 and the steering angle of the wheel 140.

Alternatively, the alignment determiner 220 may determine the misalignment if the increase in the amount of current of the drive motor is greater than or equal to the maximum current value is detected based on current information of the drive motor for driving the rack and pinion which change the direction of the wheel.

The controller 230 may set a point where the alignment of the steering angle of the steering wheel 100 and the steering angle of the wheel 140 starts to deviate as an initial point. For example, if the steering angle of the steering wheel 100 is further rotated even though the position of the rack displacement reaches the end of the rack and can no longer move, the wheel is not additionally steered in response to the steering angle of the steering wheel. In this case, the controller 230 may set a steering angle value of the steering wheel 100 at this time as an initial point and store it as initial point information. Alternatively, the controller 230 may set, as an initial point, the steering angle value of the steering wheel 100 at a point where a deviation with the wheel 140 occurs due to idleness in the rotation of the steering wheel 100. For example, the steering angle position may be information about a steering angle value (e.g., 380 degrees) or the number of rotations of a steering wheel (e.g., 1.6 turns).

If the measured steering angle of the steering wheel 100 is equal to or greater than the steering angle value corresponding to the initial point, the controller 230 may stop transmitting a steering control signal generated by the steering angle information of the steering wheel 100. For example, the controller 230 may generate a steering control signal using signals such as a steering angle and a steering torque of the steering wheel 100 by the driver and the speed of the vehicle. The controller 230 may transmit the generated steering control signal of the steering wheel 100 through a network (ex, CAN communication), and the steering rack module 130 may calculates the rack displacement using the steering control signal and drive the driving motor.

However, if it is detected that the position of the rack displacement has reached the end based on the rack position sensor by rotating the steering wheel 100 to the right or left end, the controller 230 may stop the transmission of the steering control signal. This is because, even when the steering control signal is received, if the position of the rack displacement reaches the end, the position of the rack displacement cannot be moved beyond the end. Accordingly, the steering angle of the wheel 140 can no longer be changed in the corresponding rotational direction.

In the case that a steering angle of the steering wheel deviates by more than an angle corresponding to the initial point and then returns to the initial point again, if the steering angle information of the steering wheel 100 coincides with the initial point information, the controller 230 may initiate or resume the transmission of the steering control signal generated by the steering angle information of the steering wheel 100. For example, if the steering angle of the steering wheel 100 further rotates beyond the initial point set as the right or left end, the controller 230 may stop the transmission of the steering control signal generated based on the steering angle information of the steering wheel 100 equal to or greater than the angle corresponding to the initial point. However, if the steering wheel 100 rotates by changing the rotation direction and if the steering angle position of the steering wheel 100 coincides with the set initial point position again, the controller 230 may restart the transmission of the steering control signal generated based on the steering angle information of the steering wheel.

In the case that a steering angle of the steering wheel deviates by more than an angle corresponding to the initial point and then returns to the initial point again, if the steering angle of the steering wheel is equal to or less than the angle corresponding to the initial point, the controller may control a position of the rack displacement to be adjusted based on the steering angle information of the steering wheel 100. The controller 230 may synchronize the steering angle of the wheel 140 based on the steering angle information of the steering wheel 100. For example, if the steering angle of the steering wheel 100 measured by the steering angle sensor corresponds to 370 degrees, which is an angle corresponding to the initial point, the steering angular position of the wheel 140 may be set to correspond to 10 degrees. The controller 230 may synchronize, based on 370 degrees, the steering angle of the steering wheel with the steering angle of the wheel by driving the driving motor of the rack and pinion that changes the direction of the wheel.

Figure 3:
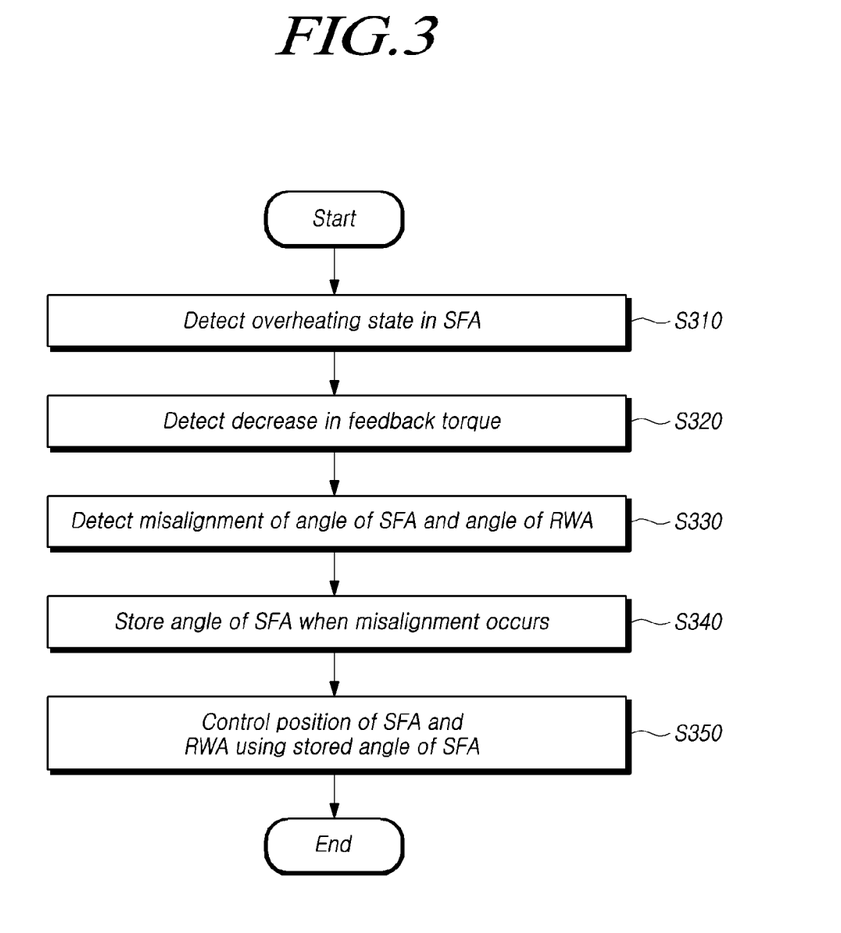
FIG. 3 is a flowchart for explaining an operation of a vehicle steering control device according to an embodiment of the present disclosure.

FIG. 3 is a flowchart for explaining an operation of a vehicle steering control device according to an embodiment of the present disclosure.

It will be described an example of an overheat protection (OHP) operation, which is a control operation performed by the steering control device of a vehicle according to an exemplary embodiment of the present disclosure if an overheating condition of the reaction force motor occurs, with reference to FIG. 3.

The overheat detector 210 of the steering control device 110 may detect the occurrence of an overheating state due to overheating of the reaction force motor (S310). For example, the overheat detector 210 may include a temperature sensor to detect the temperature of the heating part. The overheat detector 210 may record a time duration when the temperature measured by the temperature sensor is equal to or greater than a set threshold temperature, and may determine the overheating state if the time duration is equal to or greater than a predetermined time. Alternatively, if the temperature measured by the temperature sensor is greater than or equal to a set threshold temperature, the overheat detector 210 may determine the occurrence of the overheating state and provide a warning signal or an alarm. In this case, the threshold temperature may be set differently according to the mounting position of the reaction force motor, an ambient temperature of motor mounting location, the type of the motor, the capacity of the motor, or the amount of applied current. This has been described as an example and is not limited thereto.

The alignment determiner 220 of the steering control apparatus 110 may detect a decrease in feedback torque (S320). For example, the alignment determiner 220 may detect whether the feedback torque of the reaction force motor is reduced due to the overheat protection (OHP) function, which is a protection logic when overheating occurs. By using the overheat protection function, the amount of current applied to the reaction force motor can be limited by adjusting the torque gain according to the temperature. Accordingly, if the overheat protection function operates, the alignment determiner 220 may detect the decrease of the current amount of the reaction force motor to prevent overload of the motor.

The alignment determiner 220 of the steering control device 110 may detect a misalignment, i.e., a deviation in the alignment between the steering angle of the steering wheel and the steering angle of the wheel (S330). For example, the steering reaction force transmitted to the steering wheel may decrease according to a decrease in the current amount of the reaction force motor or a decrease in the feedback torque. In this case, the alignment determiner 220 may detect a misalignment between the steering angle of the steering wheel and the steering angle of the wheel due to the decrease in the steering reaction force.

The controller 230 of the steering control device 110 may store the steering angle of the steering wheel at a point where the steering angle of the steering wheel and the steering angle of the wheel are misaligned (S340). For example, if the position of the rack displacement, which is the point at which the steering angle of the steering wheel and the steering angle of the wheel are misaligned, corresponds to the end of the rack, the controller 230 may store the position of the steering angle of the steering wheel at that time as initial point information.

The controller 230 of the steering control device 110 may control the positions of the steering wheel and the wheels by using the positions of the steering angles of the steering wheels stored as initial point information (S350). For example, the controller 230 may adjust the position of the rack displacement using the steering angle position of the steering wheel at the point where the steering angles of the steering wheel and the wheel are misaligned to control the steering angle of the wheel to be synchronized with the steering angle of the steering wheel. It will be described details regarding the synchronization operation of the steering wheel and the wheel by the controller 230 later with reference to FIG. 4.

Figure 4:
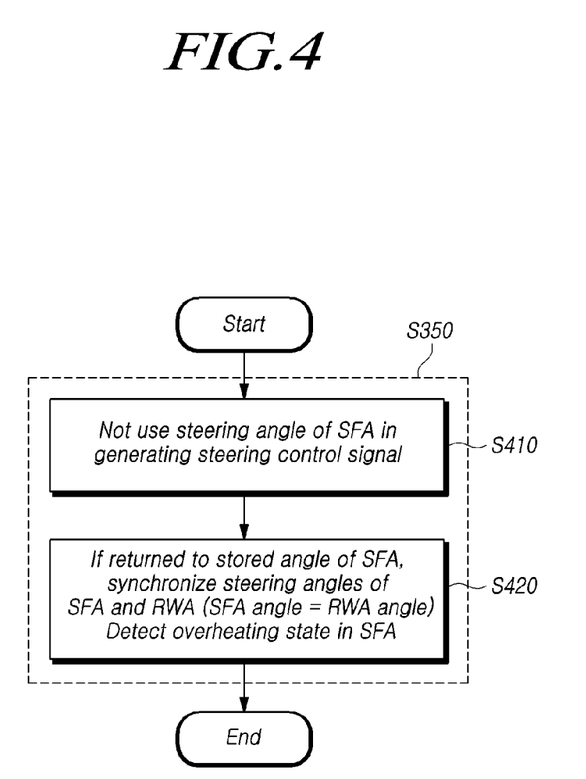
FIG. 4 is a flowchart illustrating an operation of a vehicle steering control device in the case of a misalignment according to an embodiment of the present disclosure.

FIG. 4 is a flowchart illustrating an operation of a vehicle steering control device in the case of a misalignment according to an embodiment of the present disclosure.

Referring to FIG. it will be described an example in which the steering control device of a vehicle according to an embodiment of the present disclosure performs a control operation of synchronizing the positions of the steering wheel and the wheel by using the steering angle information of the steering wheel when a misalignment occurs obtained in step S340. If the steering wheel continues to rotate in the same rotational direction even when a misalignment occurs, the controller 230 of the steering control device 110 may not use the steering angle information of the steering wheel rotated beyond the steering angle of the point of occurrence of the misalignment to generate a steering control signal (S410). For example, if the driver rotates the steering wheel in the right direction, the position of the rack displacement that rotates the wheel may reach the end. In this case, even if the driver continues to rotate the steering wheel in the right direction, the steering angle information of the steering wheel from the point where the position of the rack displacement reaches the end may not be used to generate the steering control signal. Specifically, the controller 230 may store the steering angle information of the steering wheel from the point where the position of the rack displacement reaches the end, and the steering angle information of the steering wheel shifted based on the stored steering angle information may be ignored.

If the steering wheel rotates beyond the steering angle of the steering wheel at the time of the misalignment and then returns to the point where the misalignment occurred, the controller 230 of the steering control device 110 may synchronize the steering angle of the steering wheel with the steering angles of the wheels (S420). For example, after the driver continues to rotate the steering wheel in the right direction even after the position of the rack displacement reaches the end, the driver may change the rotation direction to rotate to the left. At this time, as the driver rotates the steering wheel to the left, the position of the rack displacement may return to within the steering angle of the steering wheel when the end is reached. Then, if the steering wheel returns to within the steering angle when the position of the rack displacement reaches the end, the controller 230 may generate a steering control signal again using the steering angle information of the steering wheel.

The control unit 230 may synchronize the steering angle of the wheel to correspond to the steering angle information of the steering wheel at the point where the position of the rack displacement reaches the end. For example, the controller 230 may calculate a displacement amount of the rack for changing the steering angle of the wheel. The controller 230 may adjust the position of the displacement of the rack so that the steering angle of the wheel corresponds to the steering angle information of the steering wheel by using the calculated the displacement amount of the rack.

Figure 5:
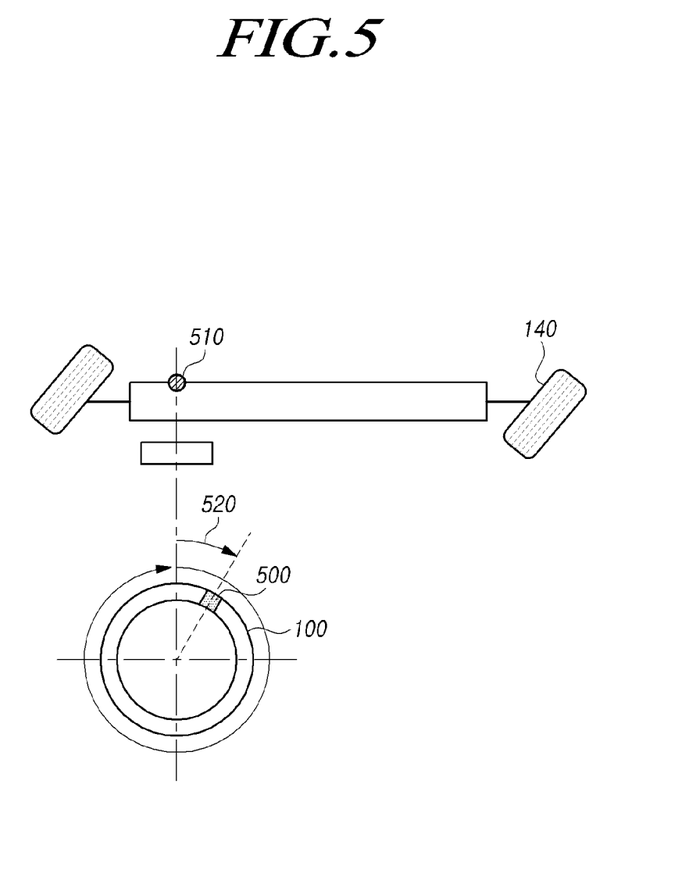
FIG. 5 is a diagram for explaining an operating state of a steering control device for a vehicle according to an embodiment of the present disclosure.

FIG. 5 is a diagram for explaining an operating state of a steering control device for a vehicle according to an embodiment of the present disclosure.

Referring to FIG. 5, it will be described an example of an operation before the misalignment of the steering angle of the steering wheel and the steering angle of the wheel in the steering control device for a vehicle. As shown as an example, if the driver rotates the steering wheel 100 in the right direction, the vehicle steering control device 110 may also rotate the vehicle wheel 140 in the right direction. Specifically, the wheel 140 of the vehicle may be steered at an angle at which the rotation axis of the wheel 140 rotates in proportion to the steering angle of the steering wheel 100. The rotation angle of the wheel 140, that is, the steering angle of the wheel, may be calculated as the displacement amount of the rack bar corresponding to the rotation angle in consideration of the gear ratio, etc., and the wheel may be steered by moving the displacement of the rack bar.

For example, the initial point 500 may set the steering angle value of the steering wheel at a point where the steering angle of the steering wheel 100 and the steering angle of the wheel 140 start to be misaligned. Details regarding the initial point are the same as described above with reference to FIG. 2. If the steering angle of the steering wheel 100 rotates at an angle corresponding to the initial point 500 or less (section 520), the vehicle steering control device 110 may move the position 510 of the rack displacement corresponding to the steering angle of the steering wheel to steer the wheel. Accordingly, if the steering angle of the steering wheel 100 is rotated 520 at an angle corresponding to the initial point 500 or less, the vehicle steering control device 110 may be determined as a normal operating range of the wheel.

Figure 6:
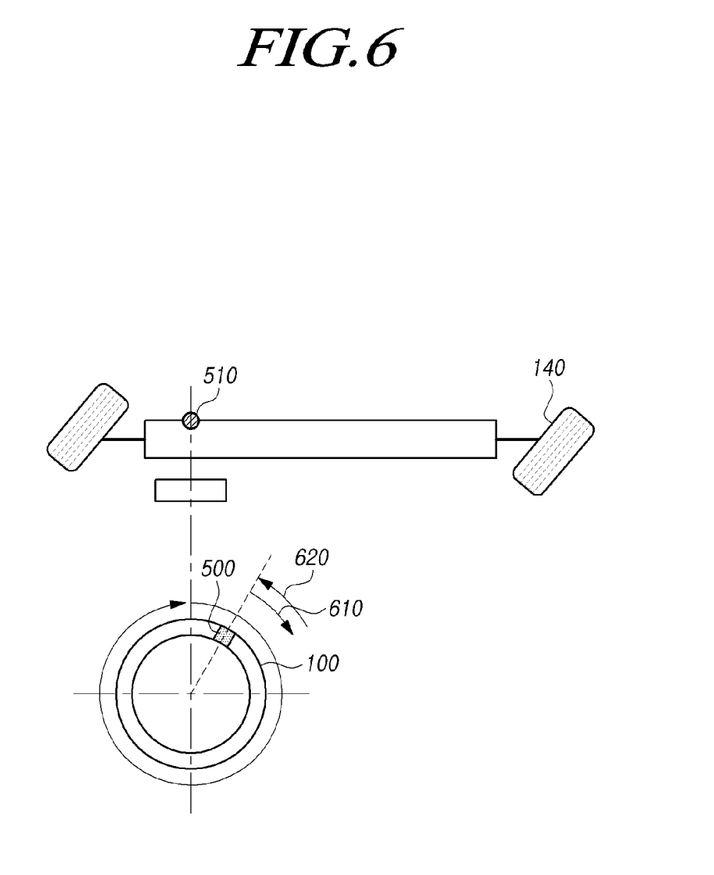
FIG. 6 is a diagram for explaining an operating state of a steering control device for a vehicle in the case of a misalignment according to an embodiment of the present disclosure.

FIG. 6 is a diagram for explaining an operating state of a steering control device for a vehicle in the case of a misalignment according to an embodiment of the present disclosure.

Referring to FIG. 6, for example, if the driver continues to rotate the steering wheel 100 to the right end, the wheel 140 of the vehicle rotates in the right direction, but the further steering of the wheel at a predetermined position may become impossible. Specifically, the wheel 140 of the vehicle may be steered according to the displacement of the rack bar corresponding to the steering angle of the steering wheel 100, but if the displacement of the rack bar falls within a specific range from the end, the rack bar may no longer be moved. Accordingly, the wheel 140 of the vehicle may not be able to further steer if the displacement of the rack bar reaches the end.

For example, in the vehicle steering control device 110, in a range of the angle greater than the angle corresponding to the initial point 500, which is the point at which the steering angles of the steering wheel 100 and the wheel 140 start to be misaligned, there may be an abnormal operating range. The vehicle steering control device 110 may store the steering angle information of the steering wheel at the initial point 500 which is the start point of the abnormal operation range. If the steering wheel 140 further rotates (sections 610 and 620) at an angle greater than the angle corresponding to the initial point 500, the vehicle steering control device 110 cannot steer the wheel any more. This is because the vehicle steering control device 110 may stop transmitting the steering control signal generated by the steering angle information of the steering wheel if the steering angle of the steering wheel coincides with the angle corresponding to the initial point. Accordingly, if the steering angle of the steering wheel rotates (sections 610 and 620) at an angle corresponding to the initial point or more, the steering control signal generated by the steering angle information of the steering wheel may not be transmitted.

Figure 7:
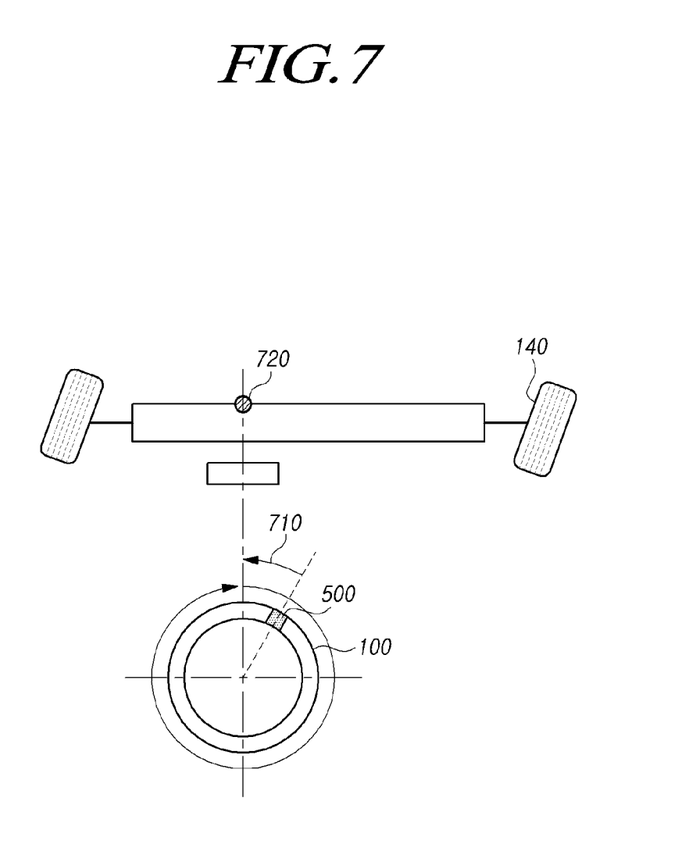
FIG. 7 is a diagram for explaining an operating state of a steering control device for a vehicle after an occurrence of a misalignment according to an embodiment of the present disclosure.

FIG. 7 is a diagram for explaining an operating state of a steering control device for a vehicle after an occurrence of a misalignment according to an embodiment of the present disclosure.

Referring to FIG. 7, as an example, if the driver rotates the steering wheel 100 to the right end and then changes the rotation direction to rotate to the left, the wheel 140 of the vehicle may be steered from the right end to the left again.

For example, if the steering angle of the steering wheel 100 is returned based on the angle corresponding to the initial point 500, which is the point at which the steering angles of the steering wheel 100 and the wheel 140 start to be misaligned, the vehicle steering control device 110 may determine a normal operation range of the wheel again. Accordingly, the vehicle steering control device 110 may use the steering angle information of the steering wheel at the stored initial point 500. If the steering wheel 100 of the vehicle rotates 710 again at an angle corresponding to the initial point 500 or less, the vehicle steering control device 110 may rotate the steering wheel 100 corresponding to the steering angle. In this case, if the steering angle of the steering wheel deviates by more than an angle corresponding to the initial point and then returns to the initial point again, the vehicle steering control device 110 restarts the transmission of the steering control signal generated by the steering angle information of the steering wheel. Accordingly, in the case that the steering wheel rotates (section 710) again below the angle corresponding to the initial point, the steering control signal generated by the steering angle information of the steering wheel may be transmitted again. The vehicle steering control device 110 may adjust the position 720 of the rack displacement based on the stored steering angle information of the steering wheel at the initial point 500, and thus the steering angle of the wheel may be controlled.

Hereinafter, it will be described a vehicle steering control method that can be performed by the vehicle steering control device 110 described with reference to FIGS. 1 to 7.

Figure 8:
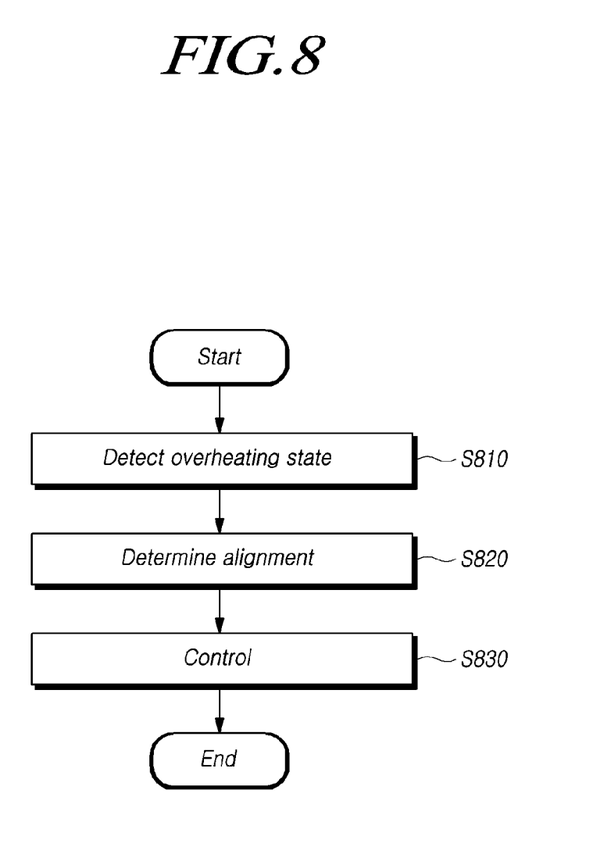
FIG. 8 is a flowchart of a steering control method for a vehicle in the case that a steering wheel returns after an occurrence of a misalignment according to an embodiment of the present disclosure.

FIG. 8 is a flowchart of a steering control method for a vehicle in the case that a steering wheel returns after an occurrence of a misalignment according to an embodiment of the present disclosure.

Referring to FIG. 8, a steering control method for a vehicle according to the present disclosure may include detecting whether of an overheating state of a reaction force motor (S810). For example, the steering control device may detect whether of the occurrence of overheating state based on motor temperature information of the reaction force motor. Alternatively, the steering control device may detect the temperature of the reaction force motor by the temperature sensor, and if the detected temperature of the reaction force motor is higher than a preset threshold temperature, may detect as the overheating state.

The steering control method for a vehicle according to the present disclosure may include determining whether of an alignment of a steering wheel and a rack displacement (S820). For example, the steering control device may determine whether of an alignment of a steering wheel and a rack displacement based on steering angle information of the steering wheel and position information of the rack displacement. Alternatively, in the case that a position of the rack displacement enters within a preset range at an end of a rack, if at least one of a decrease of a current amount of the reaction force motor and a decrease of a feedback torque of the reaction force motor is detected, the steering control device may determine that the steering wheel and the rack displacement are misaligned. In this case, the preset range may be set when the position of the rack displacement reaches the end of the right or left rack. In addition the end may mean a state in which the wheel cannot be steered any more since the rack can no longer be moved in the same direction even when the steering wheel further rotates to the right or left.

The steering control method for a vehicle according to the present disclosure may include controlling the steering wheel and the rack displacement to be aligned (S830). For example, if an overheating state is detected and determined that the steering wheel and the rack displacement is misaligned, the steering control device may set a point where the alignment starts to be misaligned as an initial point, store steering angle information of the steering wheel at the initial point as initial point information, and control the steering wheel and the rack displacement to be aligned by using the initial point information.

As another example, if a steering angle of the steering wheel is equal to or greater than an angle corresponding to the initial point, the steering control device may stop transmitting a steering control signal generated by the steering angle information of the steering wheel. Alternatively, in the case that a steering angle of the steering wheel deviates by more than an angle corresponding to the initial point and then returns to the initial point again, if the steering angle information of the steering wheel coincides with the initial point information, the steering control device may initiate or restart the transmission of a steering control signal generated by the steering angle information of the steering wheel.

As another example, in the case that a steering angle of the steering wheel deviates by more than an angle corresponding to the initial point and then returns to the initial point again, if the steering angle of the steering wheel is equal to or less than the angle corresponding to the initial point, the steering control device may control a position of the rack displacement to be adjusted based on the steering angle information of the steering wheel. That is, the steering control device may control the steering angle of the steering wheel to be synchronized with the steering angle of the wheel based on the steering angle information of the steering wheel.

Figure 9:
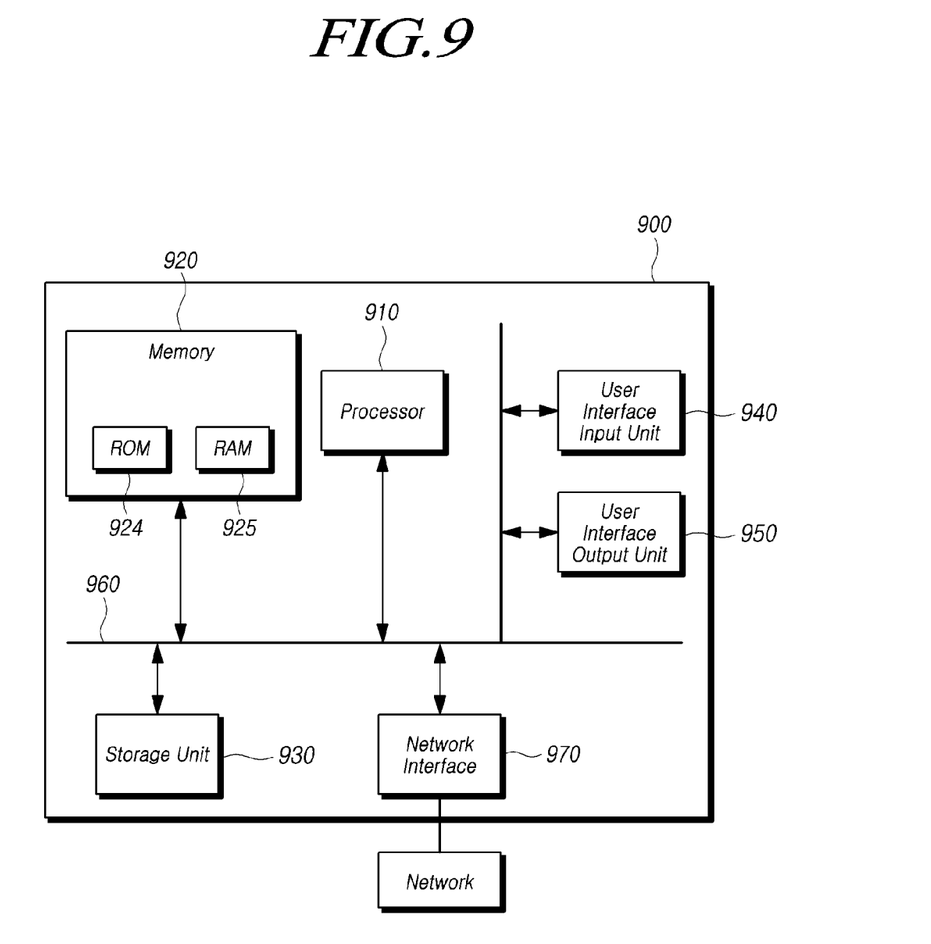
FIG. 9 is a block diagram of a computer system of a steering control device according to an embodiment of the present disclosure.

FIG. 9 is a block diagram of a computer system of a steering control device according to an embodiment of the present disclosure.

Referring to FIG. 9, the above-described embodiments may be implemented in a computer system, for example, in a computer-readable recording medium. As shown in the drawing, the computer system 900, which is an example of the steering control device according to the present embodiment may include at least one or more elements of one or more processors 910, memories 920, storage unit 930, user interface input unit 940 and user interface output unit 950, which may communicate with each other via a bus 960. Further, the computer system 900 may also include a network interface 970 for connecting to the network. The processor 910 may be a CPU or a semiconductor device that executes processing instructions stored in memory 920 and/or storage unit 930. Memory 920 and storage unit 930 may include various types of volatile/non-volatile storage media. For example, memory may include ROM 924 and RAM 925.

Accordingly, the present embodiments may be implemented as a computer-implemented method or a non-volatile computer recording medium having computer-executable instructions stored therein. The instructions, when executed by a processor, may perform the method according to at least one embodiment of the present embodiments.

More specifically, the steering control device 200 according to the present embodiment and the overheat detector 210, the alignment determiner 220 and the controller 230 included therein may be implemented as a module of a control device or an ECU of a steering system mounted on a vehicle.

The control device or ECU of such a steering system may include a processor, a storage device such as a memory, and a computer program capable of performing a specific function. In addition, the above-described overheat detector 210, the alignment determiner 220 and the controller 230 may be implemented as software modules capable of performing respective corresponding functions.

That is, the overheat detector 210, the alignment determiner 220 and the controller 230 according to the present embodiment may be implemented as respective software modules and stored in a memory, and each software module may be executed at a specific time point in an arithmetic processing unit such as an ECU included in the steering system.

According to the present disclosure, it is possible to provide a steering control device and method for a vehicle. Specifically, it is possible to provide a vehicular steering control device and method capable of securing the driving stability by controlling the alignment of the vehicle wheels by rapidly detecting a misalignment between the steering angle of the steering wheel and the steering angle of the vehicle wheel.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device of a vehicle, the steering control device comprising:
    an overheat detector configured to detect whether of an overheating state of a reaction force motor based on motor temperature information of the reaction force motor, which is included in a steering column module connected to a steering wheel of the vehicle and mechanically separated from a steering rack module connected to a rack of the vehicle;
    an alignment determiner configured to determine whether of an alignment of the steering wheel and a rack displacement based on steering angle information of the steering wheel and position information of the rack displacement; and
    a controller configured to, in response to the overheating state of the reaction force motor being detected and determined that the alignment of the steering wheel and the rack displacement is misaligned, set a point where the alignment starts to be misaligned as an initial point, store steering angle information of the steering wheel at the initial point as initial point information, and control the steering wheel and the rack displacement to be aligned by using the initial point information,
    wherein in the case that a position of the rack displacement enters within a preset range at an end of a rack, if at least one of a decrease of a current amount of the reaction force motor and a decrease of a feedback torque of the reaction force motor is detected, the alignment determiner determines that the steering wheel and the rack displacement are misaligned.

2. The steering control device of claim 1, wherein the overheat detector is configured to detect the overheating state in response to a temperature of the reaction force motor detected by a temperature sensor being higher than a preset threshold temperature.

3. The steering control device of claim 1, wherein, if a steering angle of the steering wheel is equal to or greater than an angle corresponding to the initial point, the controller stops transmitting a steering control signal generated by the steering angle information of the steering wheel.

4. The steering control device of claim 1, wherein, in the case that a steering angle of the steering wheel deviates by more than an angle corresponding to the initial point and then returns to the initial point again, if the steering angle information of the steering wheel coincides with the initial point information, the controller initiates transmission of a steering control signal generated by the steering angle information of the steering wheel.

5. The steering control device of claim 1, wherein, in the case that a steering angle of the steering wheel deviates by more than an angle corresponding to the initial point and then returns to the initial point again, if the steering angle of the steering wheel is equal to or less than the angle corresponding to the initial point, the controller controls a position of the rack displacement to be adjusted based on the steering angle information of the steering wheel.

6. A steering control method of a vehicle, the steering control method comprising:
    detecting whether of an overheating state of a reaction force motor based on motor temperature information of the reaction force motor, which is included in a steering column module connected to a steering wheel of the vehicle and mechanically separated from a steering rack module connected to a rack of the vehicle;
    determining whether of an alignment of the steering wheel and a rack displacement based on steering angle information of the steering wheel and position information of the rack displacement; and
    setting, in response to the overheating state of the reaction force motor being detected and determined that the alignment of the steering wheel and the rack displacement is misaligned, a point where the alignment starts to be misaligned as an initial point, storing steering angle information of the steering wheel at the initial point as initial point information, and controlling the steering wheel and the rack displacement to be aligned by using the initial point information,
    wherein the determining comprises, in the case that a position of the rack displacement enters within a preset range at an end of a rack, if at least one of a decrease of a current amount of the reaction force motor and a decrease of a feedback torque of the reaction force motor is detected, determining that the steering wheel and the rack displacement are misaligned.

7. The steering control method of claim 6, wherein the detecting comprises detecting as the overheating state in response to a temperature of the reaction force motor detected by a temperature sensor being higher than a preset threshold temperature.

8. The steering control method of claim 6, wherein the controlling comprises, if a steering angle of the steering wheel is equal to or greater than an angle corresponding to the initial point, stopping transmitting a steering control signal generated by the steering angle information of the steering wheel.

9. The steering control method of claim 6, wherein the controlling comprises, in the case that a steering angle of the steering wheel deviates by more than an angle corresponding to the initial point and then returns to the initial point again, if the steering angle information of the steering wheel coincides with the initial point information, initiating transmission of a steering control signal generated by the steering angle information of the steering wheel.

10. The steering control method of claim 6, wherein the controlling comprises, in the case that a steering angle of the steering wheel deviates by more than an angle corresponding to the initial point and then returns to the initial point again, if the steering angle of the steering wheel is equal to or less than the angle corresponding to the initial point, controlling a position of the rack displacement to be adjusted based on the steering angle information of the steering wheel.

11. A steering control device of a vehicle, the steering control device comprising:
an overheat detector configured to detect whether of an overheating state of a reaction force motor based on motor temperature information of the reaction force motor, which is included in a steering column module connected to a steering wheel of the vehicle and mechanically separated from a steering rack module connected to a rack of the vehicle;
an alignment determiner configured to determine whether of an alignment of the steering wheel and a rack displacement based on steering angle information of the steering wheel and position information of the rack displacement; and
a controller configured to, in response to the overheating state of the reaction force motor being detected and determined that the alignment of the steering wheel and the rack displacement is misaligned, set a point where the alignment starts to be misaligned as an initial point, store steering angle information of the steering wheel at the initial point as initial point information, and control the steering wheel and the rack displacement to be aligned by using the initial point information, wherein if a steering angle of the steering wheel is equal to or greater than an angle corresponding to the initial point, the controller stops transmitting a steering control signal generated by the steering angle information of the steering wheel, or in the case that the steering angle of the steering wheel deviates by more than the angle corresponding to the initial point and then returns to the initial point again, if the steering angle information of the steering wheel coincides with the initial point information, the controller initiates transmission of the steering control signal generated by the steering angle information of the steering wheel, or in the case that the steering angle of the steering wheel deviates by more than the angle corresponding to the initial point and then returns to the initial point again, if the steering angle of the steering wheel is equal to or less than the angle corresponding to the initial point, the controller controls a position of the rack displacement to be adjusted based on the steering angle information of the steering wheel.

* * * * *